US009043636B2

(12) United States Patent
Cai (10) Patent No.: US 9,043,636 B2
(45) Date of Patent: May 26, 2015

(54) METHOD OF FENCING IN A CLUSTER SYSTEM

(71) Applicant: Hangzhou H3C Technologies Co., Ltd., Zhejiang (CN)

(72) Inventor: Zhifeng Cai, Beijing (CN)

(73) Assignee: HANGZHOU H3C TECHNOLOGIES CO., LTD., Zhejiang (CN)

( * ) Notice: Subject to any disclaimer, the term of this patent is extended or adjusted under 35 U.S.C. 154(b) by 226 days.

(21) Appl. No.: 13/687,930

(22) Filed: Nov. 28, 2012

(65) Prior Publication Data

US 2013/0139219 A1  May 30, 2013

(30) Foreign Application Priority Data

Nov. 28, 2011  (CN) .......................... 2011 1 0385294

(51) Int. Cl.
*G06F 11/00* (2006.01)
*H04L 29/06* (2006.01)
*G06F 11/07* (2006.01)

(52) U.S. Cl.
CPC ............ *H04L 63/10* (2013.01); *G06F 11/0709* (2013.01)

(58) Field of Classification Search
CPC ............ G06F 11/0709; G06F 11/1425; G06F 11/1428; G06F 11/143
USPC ............. 714/4.1, 4.2; 709/224, 225; 370/216, 370/217, 221; 718/1
See application file for complete search history.

(56) References Cited

U.S. PATENT DOCUMENTS

| 7,590,737 | B1* | 9/2009 | Chen et al. ................... 709/226 |
| 7,653,682 | B2* | 1/2010 | Erasani et al. ................. 709/201 |
| 7,676,687 | B2* | 3/2010 | Gunda et al. ................... 714/4.4 |
| 8,495,323 | B1* | 7/2013 | Tatavarty ...................... 711/164 |
| 2005/0283641 | A1 | 12/2005 | Clark et al. |
| 2010/0306566 | A1* | 12/2010 | Dehaan et al. ................ 713/330 |
| 2011/0055375 | A1* | 3/2011 | Heim et al. .................... 709/224 |
| 2011/0289344 | A1 | 11/2011 | Bae et al. |

FOREIGN PATENT DOCUMENTS

| CN | 1694415 | 11/2005 |
| CN | 102077514 | 5/2011 |

OTHER PUBLICATIONS

CN First Office Action dated Dec. 4, 2013 issued on CN Patent Application No. 201110385294.0 dated Nov. 28, 2011, The State Intellectual Property Office, P.R. China.

* cited by examiner

*Primary Examiner* — Joseph Kudirka
(74) *Attorney, Agent, or Firm* — Hewlett-Packard Patent Department (57) ABSTRACT

A method of fencing in a cluster system including network devices and a management network device is disclosed. Each network device may run an application program and comprises a fence device. A first network device receives a fence operation command from the management network device. The fence operation command contains information of a target network device and information of a target application. The first network device may determine a fence device on the first network device that corresponds to the fence operation command and activates the determined fence device such that the fence device performs a fence operation on the target application program according to the fence operation command.

13 Claims, 4 Drawing Sheets

METHOD OF FENCING IN A CLUSTER SYSTEM

CLAIM FOR PRIORITY

The present application claims priority under 35 U.S.C 119 (a)-(d) to Chinese Patent application number 201110385294.0, filed on Nov. 28, 2011, which is incorporated by reference in its entirety.

BACKGROUND

High-availability (HA) cluster is a system of multiple network devices, such as computers, working together to provide network resources for one or more client nodes in a communication network, and operates through redundancy processing to provide uninterrupted server application. Each computer functioning as a network device of an HA cluster may be regarded as a physical host node. When a physical host node is unavailable or cannot handle a client's request for other reasons, the request will be forwarded to another available physical host node in the cluster without any intervention from the client—the cluster system performs the location of available resources and completes the forwarding of the request automatically without user input. In an HA cluster environments (such as Heartbeat- or Corosync-based cluster system), as resources are shared, there is a need to protect the security and consistency of the shared data from a malfunctioning physical host node to prevent data corruptions or a system crash. For example, a cluster manager may fence abnormal physical nodes or physical nodes which have become inactive in order to prevent access to shared resources by those nodes.

DETAILED DESCRIPTION

"Fencing" is a process that protects the shared resources in a cluster system from a malfunctioning entity (e.g. an abnormal or inactive physical host node). Examples of an improved fencing method in a cluster system, in which an individual application program running on a physical node can be fenced, will now be explained with reference to the accompanying drawings.

According to one example, a first network device of a plurality of network devices receives a fence operation command from a management network device. The fence operation command contains information of a target network device amongst the plurality of network devices and information of a target application program running on the target network device. As the fence operation command contains information not only of the target network device, but also of the target application program, it is possible to fence the target application program only and leave other application programs running on the target device unaffected.

A cluster system comprises two or more network devices. In the following examples, it is assumed that the two or more network devices are physical host nodes, but it should be noted that other suitable network devices may alternatively be used. Here, a physical host node is a network device that provides information resources, services, and/or applications to users or other nodes on a communication network, and may, for example, be a host computer or a server. Each physical host node is capable of running one or more application programs such as one or more virtual machines.

Figure 1:
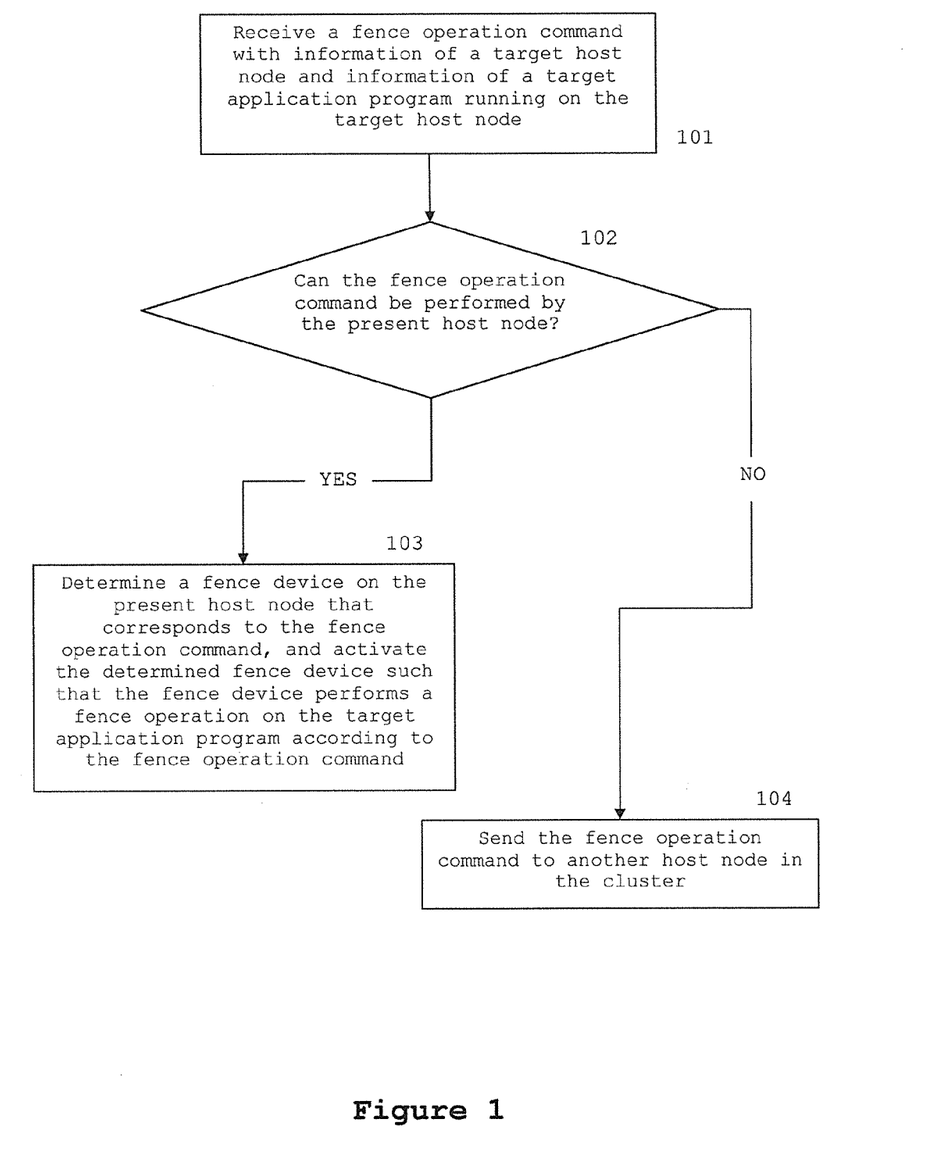
FIG. 1 is a flowchart of an example of a method of fencing in a cluster system.

FIG. 1 shows an example of a fencing method for a cluster system comprising a plurality of physical host nodes.

At block 101, a physical host node of the cluster receives a fence operation command from a management physical host node. The fence operation command includes information of a target physical host node that is one of the plurality of physical host nodes belonging to the cluster, and information of a target application program running on the target physical host node that is the target of a fence operation specified by the fence operation command.

In the example, the management physical host node (management node thereafter) is one of the physical host nodes of the cluster that is elected by the plurality of physical host nodes to be the Designated Coordinator (DC), functioning as central management for the cluster. The information of the target physical host node and the information of the target application program enable them to be identified, and the information of the target physical host node may be the host name of the target physical host node, while the information of the target application program may be the name of the target application program. As the fence operation command contains information not only of the target network device, but also of the target application program, it is possible to fence the target application program only and leave other application programs running on the target device unaffected.

In the example, the target application program may be a virtual machine. The fence operation command may include an instruction "ON" to enable an application, "OFF" to terminate an application, "RESET" to restart an application, or "GETSTATE" to obtain the status of an application.

At block 102, it is determined whether or not the fence operation command received from the management node can be performed locally by the present physical host node.

There may be cases where the present physical host node is not able to perform the received fence operation command. For example, the fence operation command may indicate the present physical host node as the target physical host node, the present physical host node may not be able to access the target physical host node, the present physical host node may not have a fence device that corresponds to the fence operation command or the fence device that corresponds to the fence operation command may be faulty. Thus, a method for determining whether the fence operation command can be executed locally may include determining that the target physical host node indicated in the fence operation command is not the present physical host node, the target physical host node can be accessed from the present physical host node, the present physical host node has at least one fence device that has a configuration corresponding to the fence operation command and the status of the fence device is normal. In this case, it is determined that the fence operation command can be executed locally at the present physical host node.

In the example, a fence operation is performed by a fence device installed in a physical host node, and there may be one or more fence devices installed in a physical host node. For example, a first physical host node may have a plurality of fence devices configured for a plurality of different application programs of a second physical host node connected to the first physical host node, or the first physical host node may have a plurality of fence devices all configured for the same application program and each corresponds to a respective one of a plurality of other physical host nodes connected to the first physical host node. Therefore, there may be more than one fence devices found in the present physical host node all configured for the target physical host node but may correspond to different application programs. Thus, when determining whether the present physical host node has a fence device that corresponds to the fence operation command, it may be necessary to determine if any of the plurality of fence devices is configured both for the target physical host node and the target application program.

It may be desirable in some implementation examples to configure the present physical host node to have only a single fence device which is specifically configured to perform the received fence operation command. In this case, it may be possible to omit the determination of whether the present physical host node is able to perform the fence operation command and has a fence device that corresponds to the fence operation command.

If it is determined that the fence operation command can be performed by the present physical host node, at block 103, the present physical host node determines an appropriate fence device on the present physical host node that corresponds to the fence operation command, and activates the determined fence device such that the fence device performs a fence operation on the target application program according to the fence operation command.

In the example, the determined fence device in the present physical host node may be activated through a corresponding interface configured for the fence device.

As there may be more than one fence device on a given physical host node, there may be a plurality of fence devices on the present physical host node capable of performing the fence operation specified by the fence operation command. In an example, each fence device may be preconfigured with information of a specific fence operation target, such that the fence device performs the corresponding fence operation only on the specified target. The information of a fence operation target may comprise different information, and the method for determining an appropriate fence device differs depending of the information.

In an example, if the information of a fence operation target comprises information of a physical host node that is one of the plurality of physical host nodes in the cluster, the method for determining a fence device includes finding at least one fence device in the present physical host node that is in a normal operation state and is preconfigured with information of the target network device. In a case where a plurality of fence devices are found in the present physical host node, one fence device is selected from amongst the found plurality of fence devices. Here, a normal operation state simply refers to an operation state with no error.

In another example, if the information of a fence operation target comprises information of an application program, the method for determining a fence device includes finding at least one fence device in the present physical host node that is in the normal operation state and is preconfigured with information of the target application program. In a case where a plurality of fence devices is found, one fence device is selected from amongst the found plurality of fence devices.

In yet another example, if the information of a fence operation target comprises information of a physical host node that is one of the plurality of physical host nodes in the cluster and information of an application program, the method for determining a fence device includes finding at least one fence device that is in the normal operation state and that is preconfigured with information of the target network device and information of the target application program. In a case where a plurality of fence devices is found, one fence device is selected from amongst the found plurality of fence devices.

In the examples, when it is determined that the fence operation command can be executed locally at the present physical host node, the present physical host node may determine the appropriate fence device according to the fence operation command, then through a corresponding interface of the fence device the present physical host node may activate the fence device. Here, the fence device may be a shell script. By implementing the shell script, the fence operation command may be executed remotely from the present physical host node to perform a fence operation on the target application running on the target physical host node. A fence device may also be implemented by other similar script or programming languages, such as Python, Perl or C.

When it is determined at block 102 that the fence operation command cannot be executed locally at the present physical host node, the present physical host node sends the fence operation command to one or more other physical host nodes in the cluster, to enable another physical host node to complete the fence operation command. At block 104, the fence operation command is sent to another physical host node in the cluster. Here, the other physical host nodes do not include the management node.

In the example, when the fence operation command is sent to one or more other physical host nodes in the cluster, the present physical host node may send the fence operation command to a plurality of other physical host nodes in the cluster in a cluster message that is multicasted to the plurality of other physical host nodes. Here, when the present physical host node determines that the fence operation command cannot be executed locally, it may send the fence operation command to one or more other physical host nodes in the cluster. The present physical host node may also in turn receive a fence operation command that is sent from another physical host node.

In the example, if the present physical host node receives a fence operation command sent from another physical host node in the cluster, the present physical host node determines whether the fence operation command can be executed locally. If it is determined that the fence operation command can be executed by the present physical host node, as described with reference to block 103, the present physical host node determines a corresponding fence device according to the received fence operation command, and activates the fence device through an interface corresponding to the fence device, and performs the fence operation remotely on the target application running on the target physical host node using the fence device. If it is determined that the fence operation command cannot be performed locally, the present physical host node may discard the fence operation command.

In the examples shown with reference to FIG. 1, the application program may be a virtual machine.

STONITH ("Shoot The Other Node In The Head") techniques may be implemented to perform a fence operation to isolate a malfunctioning physical host node from the cluster. In the present examples, a STONITH technique may also be used to isolate a malfunctioning application program on a physical host node.

When implementing a STONITH technique in the application of fencing a physical host node, a STONITHD daemon is responsible for receiving the fence operation command sent by the cluster's management node and the fence operation command included in a cluster message sent by other physical host nodes in the cluster. In this case, a STONITH plugin may be used as an interface for implementing a fence operation command, and a fence device may be implemented by a STONITH device.

In the examples, when the application program is a virtual machine, the fence operation to be performed on the target application program running on the target physical host may be based on libvirt (e.g., an open source application program interface, daemon and management tool for managing platform virtualization) or another platform virtualization management operation tool. A fence device may execute a fence operation command remotely on the target application program on the target physical host node using a virsh command line tool, which is an open source tool, or another tool. A libvirt-based management tool on the target physical host node then performs the fence operation on the target application program based on the virsh command.

An implementation example illustrating the fencing method of FIG. 1 is described below, implementing STONITH techniques to perform a fence operation on a virtual machine running on a physical host node. The implementation example will be explained with reference to FIG. 2 and FIG. 3.

Figure 2:
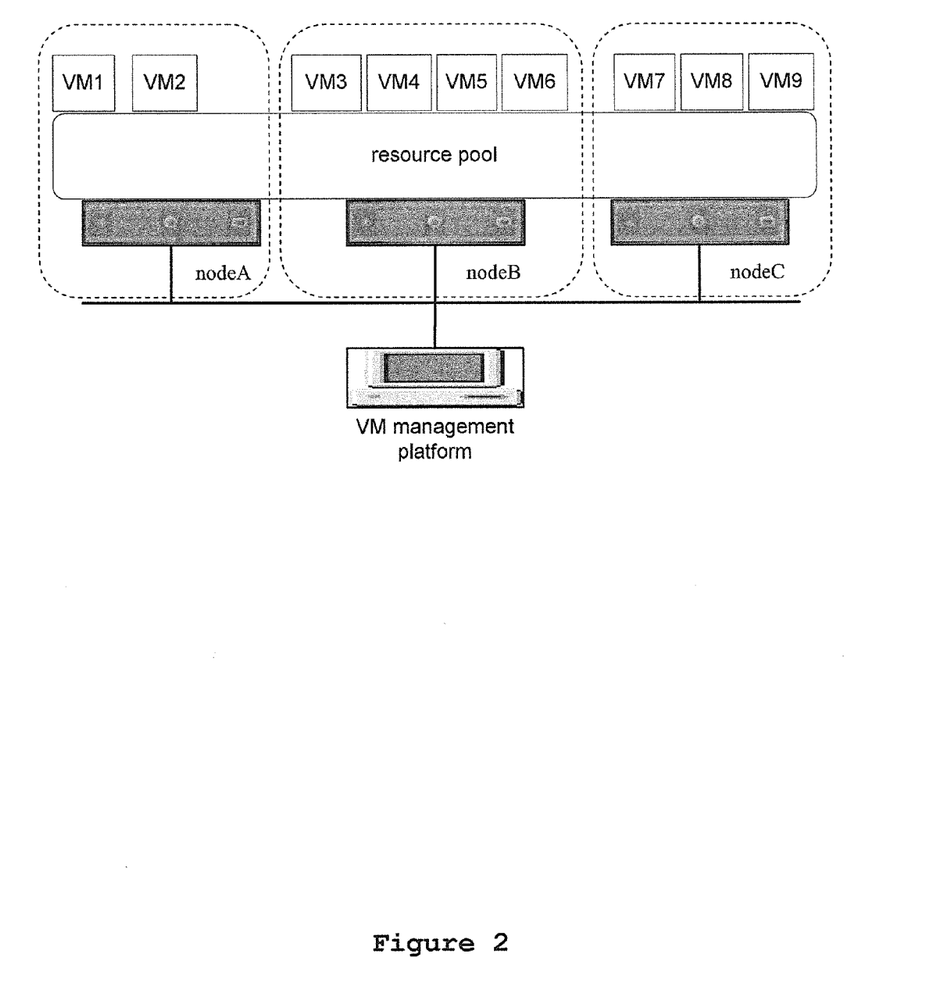
FIG. 2 is a schematic network diagram of an example of a cluster system.

FIG. 2 is a schematic network diagram of an example of a cluster system. The cluster includes three physical host nodes, nodeA, nodeB, and nodeC. There are two virtual machines, VM1, VM2, running on the physical host node nodeA, four virtual machines, VM3, VM4, VM5, VM6, running on the physical host node nodeB, and three virtual machines, VM7 VM8, VM9, running on the physical host nodes nodeC.

In the following example, assume that fencing is required for the virtual machine VM5 on nodeB, and the management node of the cluster selects nodeC to execute a corresponding fence operation command, for example using the fencing method of FIG. 1. An implementation example of a specific fence operation based on the cluster system of FIG. 2 is shown in the schematic diagram of FIG. 3.

Figure 3:
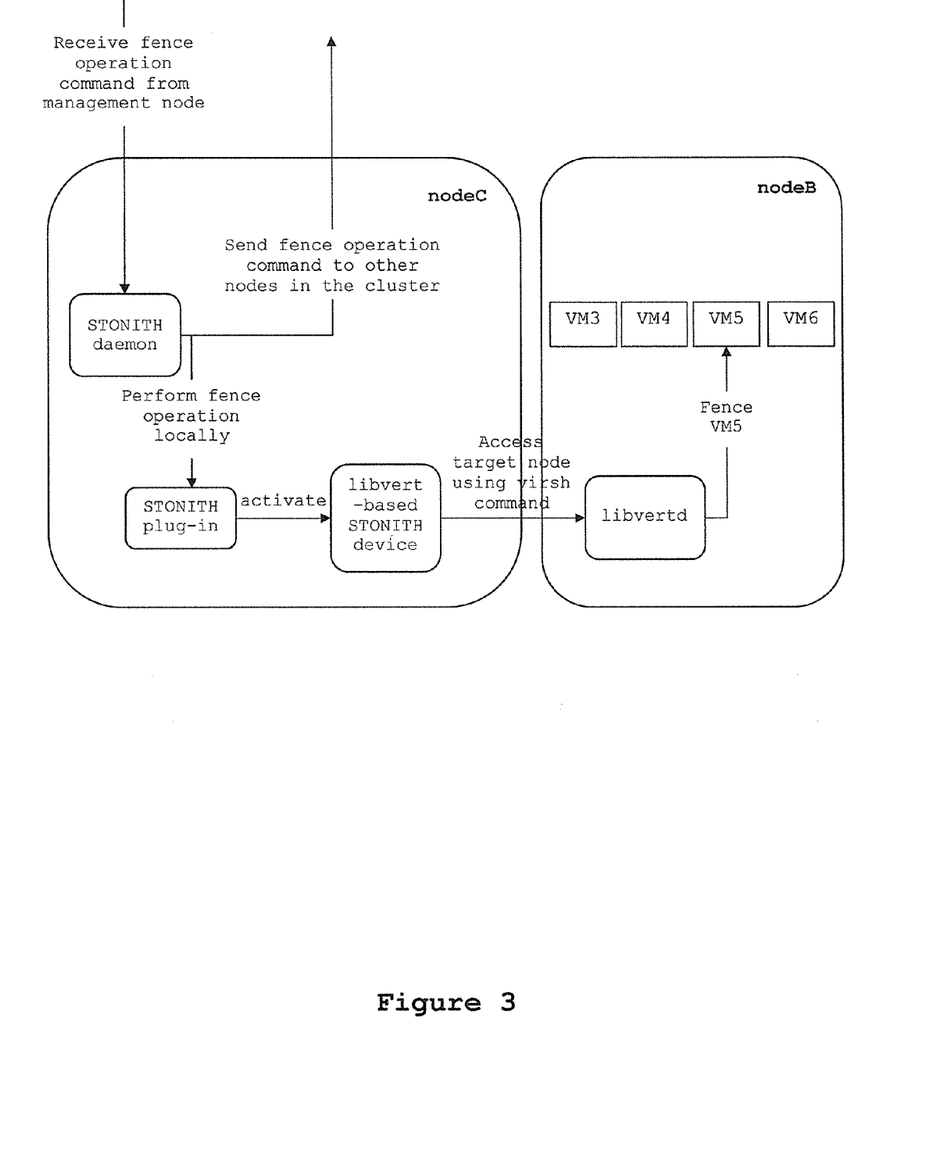
FIG. 3 is a schematic diagram illustrating an example of a fencing method based on the cluster system of FIG. 2.

The operation begins with a STONITHD daemon on nodeC receiving a fence operation command from the management node of the cluster containing an identification of nodeB and an identification of VM5.

The STONITHD daemon traverses all fence devices on nodeC to determine whether the fence operation command can be performed locally at nodeC. Since the fence operation command contains the identification of the physical host node nodeB which is different from nodeC, provided that there is a connection between nodeC and nodeB such that nodeB is accessible to nodeC, and that nodeC has a fence device in a normal state that is capable of performing the received fence operation command, the STONITHD daemon determines that the fence operation command can be executed locally at nodeC.

The STONITHD daemon then selects a STONITH device (fence device) that corresponds to the fence operation command, and through a STONITH plugin (interface) that corresponds to the selected STONITH device activates the selected STONITH device. In general, a STONITH device and a corresponding STONITH plugin is a one-to-one correspondence, but different arrangements may be possible depending on specific implementation requirements.

To execute the fence operation command, the corresponding STONITH plugin is called, which forks to a sub-process (or child process), and the selected STONITH device is blocked and called in the sub-process.

The activated STONITH device executes the fence operation command remotely from nodeC to nodeB through a virsh command line tool to perform the fence operation on VM5.

The libvirt management tool on nodeB performs a fence operation on VM5 in accordance with the fence operation command. The fence operation on VM5 on nodeB is therefore realised.

Below are some examples of scripts for implementing the STONITH device for use in the example above.

A script implemented on a STONITH device for performing an "ON" operation may be:

```
vm_start( ) {
    local strResult
    local nodename
    local vmname
    nodename=$1
    vmname=$2
    strResult=$(virsh -c qemu+ssh://$nodename/system start $vmname 2>&1)
    if [ $? -eq 0 ]; then
        dolog.sh info "Virtual machine $vmname was started successfully."
        return 0
    fi
    if echo "$strResult" | grep -i 'Domain is already active' > /dev/null 2>&1; then
        dolog.sh info "Virtual machine $vmname is already active."
        return 0
    fi
    dolog.sh err "Failed to start virtual machine $vmname. return: $strResult"
    return 1
}
```

A script implemented on a STONITH device for performing an "OFF" operation may be:

```
vm_stop( ) {
    local strResult
    local nodename
    local vmname
    nodename=$1
    vmname=$2
    strResult=$(virsh -c qemu+ssh://$nodenatne/system destroy $vmname 2>&1)
    if [ $? -eq 0 ]; then
        dolog.sh info "Virtual machine $vmname has been stopped successfully."
        return 0
    fi
    if echo "$strResult" | grep -i 'domain is not running' > /dev/null 2>&1; then
        dolog.sh info "Virtual machine $vmname is not running."
        return 2
    fi
    dolog.sh err "Failed to stop virtual machine $vmname. return: $strResult"
    return 1
}
```

A script for performing a "RESET" operation may be realised using the operation command "OFF" then the operation command "ON" such as the examples above.

A script of implemented on a STONITH device for performing a "GETSTATE" operation may be:

```
device_getstatus( ) {
    local nodename
    nodename=$1
    virsh -c qemu+ssh://$nodename/system list --all 2>&1
    if [ $? -eq 0 ]; then
        return 0
    fi
    return 1
}
```

It should be noted that the scripts given above corresponding to various fence operation commands are only implementation examples. Other similar scripts, such as PYTHON, programming languages, or other executable programs may also be used.

The present disclosure also provides a network device for implementing the fencing method and procedure described in the examples above, in or as a physical host node in a cluster system.

Figure 4:
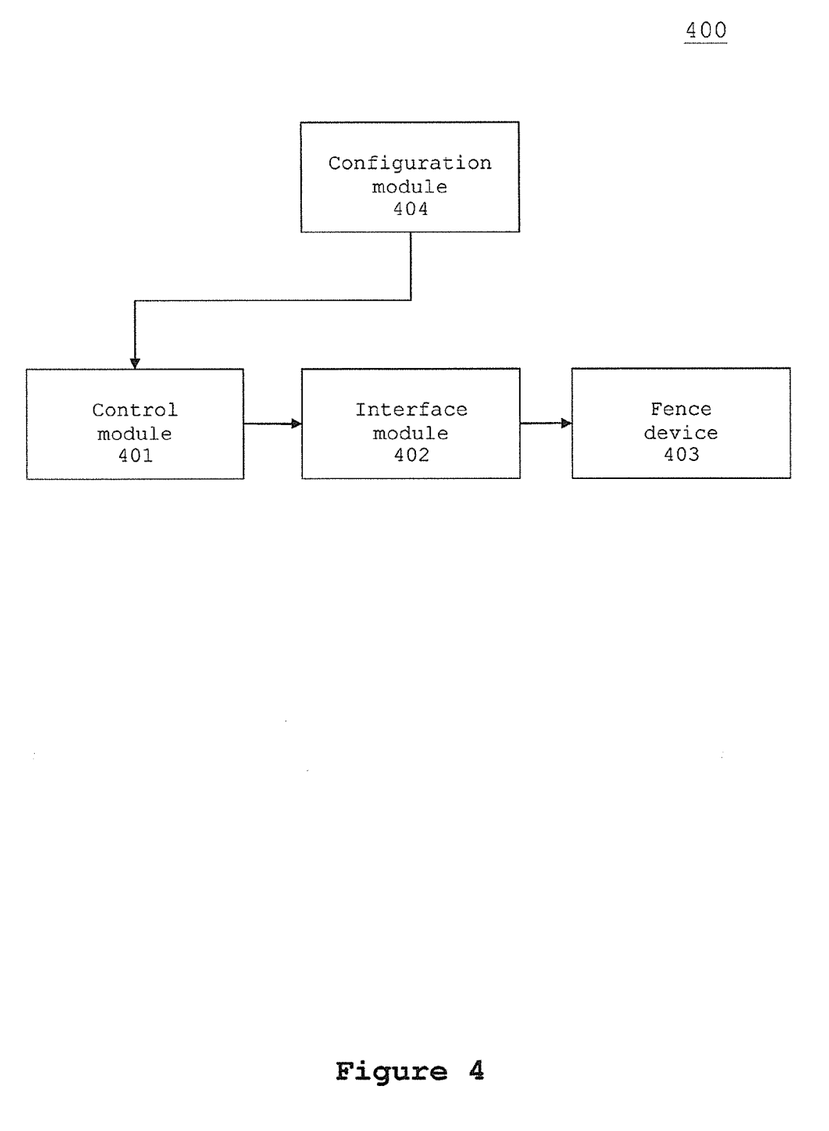
FIG. 4 is a schematic diagram of an example of a network device.

FIG. 4 is an example of a network device that can be implemented in a cluster system, such as the cluster of FIG. 2, as a physical host node. The network device 400 comprises a control module 401, an interface module 402, and a fence device 403. Although only one fence device is shown in FIG. 4, it should be understood that two or more fence devices may be provided to the network device 400.

The control module 401 is configured to receive a fence operation command sent by the cluster's management node, and to determine whether the fence operation command received from the management node can be executed locally. As described above, the fence operation command contains information of a target physical host node and a target application program running on the target physical host node. The control module 401 is further configured to determine a fence device corresponding to the fence operation command, for instance fence device 403, if it is determined that the fence operation command received from the management node can be executed locally. Through a corresponding interface provided by the interface module 402, the fence device 403 is activated for executing the received fence operation command on the target application program on the target physical host node.

The interface module 402 is configured to provide an interface corresponding to the fence device 403 determined by the control module 401.

The fence device 403 is configured to, after being activated by the control module 401, execute the fence operation on the target application program on the target physical host node.

In an example, the control module 401 may be further configured to send the fence operation command to one or more other network devices (physical host node) in the cluster if it is determined that the fence operation command received from the management node cannot be performed locally by the network device 400. The control module 401 may also be configured to receive a fence operation command sent by another physical host node in the cluster. If it is determined that the fence operation command received from the another physical host node can be executed locally, the control module determines a fence device 403 corresponding to the fence operation command received from the another physical node, and activates the fence device 403 through a corresponding interface provided by the interface module 402 for performing the fence operation on the target application program on the target physical host node.

The target application program may be a virtual machine.

In an example, when performing the fence operation on the target application program on the target physical host node, the fence device 403 may be configured to remotely execute the fence operation command on the target application program on the target physical host node by initiating a libvirt management tool on the target physical host using a virsh command line tool, causing the libvirt management tool to perform a fence operation on the target application program.

In an example, the network device further comprises a configuration module 404, for pre-configuring the fence device 403 (or each fence device when more than one fence devices) with information of a fence operation target.

In an example, the configuration module 404 pre-configures the (or each) fence device 403 with information of a fence operation target comprising information of a physical host node (network device) that is the target of the fence device. In this case, the control module 401 is configured to determine a fence device 403 that corresponds to the fence operation command by finding one or more fence devices 403 that are in a normal state and are preconfigured with information of the target physical host node specified in the fence operational command, and, in the case where more than one fence devices 403 are determined, select one of the determined fence devices 403 as the fence device corresponding to the fence operation command. The control module 401 may be configured to determined that the fence operation command cannot be performed at the network device 400 if the control module 401 fails to find at least one fence device in the normal operation state that is preconfigured with information of the target physical host node (network device).

In another example, the configuration module 404 pre-configures the (or each) fence device 403 with information of a fence operation target comprising information of an application program that is the target of the fence device. In this case, the control module 401 is configured to determine a fence device 403 that corresponds to the fence operation command by finding one or more fence devices 403 that are in a normal state and are preconfigured with information of the target application program specified in the fence operational command, and, in the case where more than one fence devices 403 are determined, select one of the determined fence devices 403 as the fence device corresponding to the fence operation command. The control module 401 may be configured to determine that the fence operation command cannot be performed at the network device 401 if the control module 401 fails to find at least one fence device in the normal operation state that is preconfigured with information of the target application program.

In another example, the configuration module 404 pre-configures the (or each) fence device 403 with information of a fence operation target comprising information of a physical host node (network device) and information of an application program that is the target of the fence device. In this case, the control module 401 is configured to determine a fence device 403 that corresponds to the fence operation command by finding one or more fence devices 403 that are in a normal state and are preconfigured with information of the target physical host node and information of the target application program specified in the fence operational command, and, in the case where more than one fence devices 403 are determined, select one of the determined fence devices 403 as the fence device corresponding to the fence operation command. The control module 401 may be configured to determine that the fence operation command cannot be performed at the network device 400 if the control module 401 fails to find at least one fence device in the normal operation state that is preconfigured with information of the target physical host node (network device) and information of the target application program.

Although the flow diagrams described above show a specific order of execution, the order of execution may differ from that which is depicted.

The above examples can be implemented by hardware, software, firmware, or a combination thereof. For example, the various methods and functional modules described herein may be implemented by a processor (the term processor is to be interpreted broadly to include a CPU, processing unit, ASIC, logic unit, or programmable gate array etc.). The methods and functional modules may all be performed by a single processor or divided amongst several processors. The methods and functional modules may be implemented as machine readable instructions executable by one or more processors, hardware logic circuitry of the one or more processors, or a combination thereof. Further, the teachings herein may be implemented in the form of a software product, the computer software product being stored in a storage medium and comprising a plurality of instructions for making a computer device (e.g. a personal computer, a server or a network device such as a router, switch, access point etc.) implement the method recited in the examples of the present disclosure.

It should be understood that embodiments of the method of fencing in a cluster system and embodiments of the network device above are implementation examples only, and do not limit the scope of the invention. Numerous other changes, substitutions, variations, alternations and modifications may be ascertained by those skilled in the art, and it is intended that the present disclosure encompass all such changes, substitutions, variations, alterations and modifications as falling within the spirit and scope of the appended claims.

What is claimed is:

1. A method of fencing in a cluster system comprising a plurality of physical nodes including a management node, each physical node being capable of running at least one virtual machine, the method comprising:
    a first physical node of the cluster system:
    receiving, from the management node, a fence operation command to prevent a target virtual machine from accessing shared resources of the cluster system, the fence operation command including information identifying the target physical node running the target virtual machine; and
    in response to determining that the first physical node is capable of performing the fence operation command,
    determining a fence device on the first physical node that corresponds to the fence operation command, and activating the determined fence device such that the fence device performs a fence operation on the target virtual machine according to the fence operation command whereby the target virtual machine on the target physical node is prevented from accessing shared resources of the cluster system and another virtual machine running on the target physical node is not prevented from accessing shared resources of the cluster system.

2. The method of claim 1 further comprising the first physical node determining that the fence operation command cannot be performed by the first physical node, and in response sending the fence operation command to a second physical node of the cluster system; and
    the second physical node determining a fence device on the second physical node that corresponds to the fence operation command received from the determined fence device on the second physical node such that the fence device performs a fence operation on the target virtual machine according to the fence operation command.

3. The method of claim 1 wherein the fence device performs the fence operation by remotely performing the fence operation on the target virtual machine hosted on the target physical node according to the fence operation command by initiating a "libvirt" management tool on the target physical node using a "virsh" command line tool, the "libvirt" management tool performing the fence operation.

4. The method of claim 1 further comprising preconfiguring the determined fence device in the first physical node with information of a fence operation target, wherein:
    in a first case, the information of a fence operation target comprises information of a physical node device of the cluster system, and the determining a fence device includes finding at least one fence device in a normal operation state preconfigured with information of the target physical node, and, in a case where a plurality of fence devices are found, selecting one fence device from the found plurality of fence devices;
    in a second case, the information of a fence operation target comprises information of an virtual machine, and the determining a fence device includes finding at least one fence device in the normal operation state preconfigured with information of the target virtual machine, and, in a case where a plurality of fence devices are found, selecting one fence device from the found plurality of fence devices; or
    in a third case, the information of a fence operation target comprises information of a physical node of the cluster system and information of a virtual machine, and the determining a fence device includes finding at least one fence device in the normal operation state preconfigured with information of the target physical node and information of the target virtual machine, and, in a case where a plurality of fence devices are found, selecting one fence device from the found plurality of fence devices.

5. The method of claim 4 wherein the first physical node determines that the first network device cannot perform the fence operation command when,
    in the first case, the first physical node fails to find at least one fence device in the normal operation state preconfigured with information of the target physical node;
    in the second case, the first physical node fails to find at least one fence device in the normal operation state preconfigured with information of the target virtual machine; or
    in the third case, the first physical node fails to find at least one fence device in the normal operation state preconfigured with information of the target physical node and information of the target virtual machine.

6. The method of claim 1 wherein the fence operation command is to turn off the target virtual machine.

7. A method of fencing in a cluster system comprising a plurality of physical host nodes including a management physical host node, each physical host node being configured to run at least one virtual machine and comprising at least one fence device the method comprising:
    a first physical host node of the plurality:
    receiving a fence operation command from the management physical host node containing information identifying a target physical host node amongst the plurality of physical host nodes and information identifying a target virtual machine running on the target physical host node; and
    determining a fence device on the first physical host node that corresponds to the fence operation command if it is determined that the first physical host node is capable of performing the fence operation command, and activating the determined fence device through an interface corresponding to the fence device such that the fence device performs a fence operation to turn off the target virtual machine according to the fence operation command.

8. A first physical node for use in a cluster system that comprises a plurality of physical nodes, each physical node of the cluster system to run at least one virtual machine, the first physical node comprising a control module, an interface module, and at least one fence device,
    the control module to receive a fence operation command including information identifying a target virtual machine and information identifying a target physical node on which the target virtual machine is running, the control module further to determine a fence device from the at least one fence device that corresponds to the fence operation command if it is determined that the first physical node is capable of performing the received fence operation command, and to activate the determined fence device through a corresponding interface on the interface module;

the interface module to provide an interface for each fence device through which the control module is to activate the fence device; and the fence device determined by the control module to perform a fence operation on the target virtual machine according to the fence operation command received by the control module whereby the target virtual machine is prevented from accessing shared resources of the cluster system and another virtual machine running on the target physical node is not prevented from accessing shared resources.

9. The first physical node of claim 8 wherein the control module is to send the fence operation command to another physical node of the cluster system when it is determined that the received fence operation command cannot be performed at the first physical node.

10. The first physical node of claim 8 wherein the fence device determined by the control module is to perform the fence operation by remotely performing the fence operation on the target virtual machine running on the target physical node according to the fence operation command by initiating a "libvirt" management tool on the target physical node using a "virsh" command line tool, the management tool performing the fence operation.

11. The first physical node of claim 8 further comprising a configuration module to preconfigure the determined fence device with information of a fence operation target, wherein:

in a first case, the information of a fence operation target comprises information identifying a physical node of the cluster system, and the control module is to determine a fence device by finding at least one fence device in a normal operating state preconfigured with information identifying the target physical node, and, in a case where a plurality of fence devices are found, select one fence device from the found plurality of fence devices;

in a second case, the information of a fence operation target comprises information of a virtual machine, and the control module is to determine a fence device by finding at least one fence device in the normal operating state preconfigured with information of the target virtual machine, and, in a case where a plurality of fence devices are found, select one fence device from the found plurality of fence devices; or in a third case, the information of a fence operation target comprises information of a physical node of the cluster system and information of a virtual machine, and the control module is to determine a fence device by finding at least one fence device in the normal operating state preconfigured with information of the target physical node and information of the target virtual machine, and, in a case where a plurality of fence devices are found, select one fence device from the found plurality of fence devices.

12. The first physical node of claim 11 wherein the control module is to determine that the received fence operation command cannot be performed at the first physical node when, in the first case, the control module fails to find at least one fence device in the normal operating state preconfigured with information of the target physical node;

in the second case, the control module fails to find at least one fence device in the normal operating state preconfigured with information of the target virtual machine; or in the third case, the control module fails to find at least one fence device in the normal operating state preconfigured with information of the target physical node and information of the target virtual machine.

13. The first physical node of claim 8 wherein the fence operation command is to turn off the target virtual machine.

* * * * *